United States Patent [19]

Gremelspacher et al.

[11] 4,413,685

[45] Nov. 8, 1983

[54] PLANTER IMPLEMENT WITH ADJUSTING POSITION-DISPLAY APPARATUS AND SYSTEM THEREOF

[76] Inventors: Philip E. Gremelspacher; Cornelius J. Gremelspacher, both of Rte. No. 1, Walton, Ind. 46994

[21] Appl. No.: 131,944

[22] Filed: Mar. 21, 1980

Related U.S. Application Data

[63] Continuation-in-part of Ser. No. 102,635, Dec. 11, 1979, abandoned, which is a continuation of Ser. No. 831,558, Sep. 8, 1977, abandoned.

[51] Int. Cl.³ .......................................... A01B 63/111
[52] U.S. Cl. ........................................ 172/316; 111/1; 111/85; 172/421; 172/430; 364/433
[58] Field of Search ................... 172/4, 68, 239, 316, 172/395, 407, 411, 413, 421, 430, 468, 471, 483, 513, 538, 624, 661, 662; 111/1, 52, 59, 60, 61, 62, 63, 64, 65, 67, 69, 85, 88; 37/DIG. 19; 91/459; 364/200, 432, 433

[56] References Cited

U.S. PATENT DOCUMENTS

| | | | |
|---|---|---|---|
| 2,318,205 | 5/1943 | Drennan | 111/62 |
| 2,473,655 | 6/1949 | Lohn | 56/214 |
| 2,616,350 | 11/1952 | Robinson et al. | 172/4 |
| 2,621,575 | 12/1952 | Berg | 172/4 |
| 2,627,797 | 2/1953 | Acton | 172/4 |
| 2,685,243 | 8/1954 | Cole | 172/574 |
| 2,714,346 | 8/1955 | Valin | 172/4 |
| 2,729,157 | 1/1956 | Webb, Jr. | 111/85 X |
| 2,750,727 | 6/1956 | Wright | 56/208 |
| 2,755,721 | 7/1956 | Rusconi | 172/4 |
| 2,935,957 | 5/1960 | Denton | 172/430 X |
| 2,967,725 | 1/1961 | Roberson | 172/316 X |
| 2,975,844 | 3/1961 | Oehler et al. | 172/484 |
| 3,060,873 | 10/1962 | Powers | 111/63 X |
| 3,077,682 | 2/1963 | Small | 172/4.5 |
| 3,115,853 | 12/1963 | Gellner | 111/85 X |
| 3,136,371 | 6/1964 | Rau et al. | 172/4 |
| 3,161,164 | 12/1964 | Tanke | 172/316 X |
| 3,196,599 | 7/1965 | Meiners et al. | 56/11 |
| 3,200,778 | 8/1965 | Whelchel | 111/85 |
| 3,233,680 | 2/1966 | Arzoian et al. | 172/4 |
| 3,348,620 | 10/1967 | Orendorff | 172/316 |
| 3,356,382 | 12/1967 | Fay | 280/43.23 |
| 3,433,307 | 3/1969 | Gilbert | 172/4 |
| 3,433,309 | 3/1969 | Michaelis et al. | 172/430 |
| 3,450,074 | 6/1969 | Gatzke et al. | 111/52 |
| 3,486,761 | 12/1969 | Fay | 280/43.23 |
| 3,548,570 | 12/1970 | Knott et al. | 56/15 |
| 3,611,956 | 10/1971 | Moore et al. | 111/62 |
| 3,626,385 | 12/1971 | Bouman | 364/200 |
| 3,658,133 | 4/1972 | Sweet et al. | 172/4 |
| 3,700,041 | 10/1972 | Ryan | 172/316 |
| 3,736,988 | 6/1973 | Cantral | 172/413 X |
| 3,749,035 | 7/1973 | Cayton et al. | 172/484 X |
| 3,762,480 | 10/1973 | Hofer | 172/4 |
| 3,845,730 | 11/1974 | Koronka et al. | 111/88 |
| 3,903,623 | 9/1975 | Hyler | 172/4 X |
| 3,978,597 | 9/1976 | Brudnak, Jr. | 172/4 X |
| 4,009,668 | 3/1977 | Brass et al. | 111/88 X |
| 4,023,510 | 5/1977 | Sorie et al. | 111/85 |
| 4,031,963 | 6/1977 | Doggemiller et al. | 172/4 |
| 4,044,697 | 8/1977 | Swanson | 111/88 X |
| 4,046,399 | 9/1977 | Zeuner et al. | 172/316 X |
| 4,073,345 | 2/1978 | Miller | 172/466 X |
| 4,102,403 | 7/1978 | Steinberg | 172/413 X |
| 4,116,140 | 9/1978 | Anderson et al. | 111/85 X |
| 4,159,474 | 6/1979 | Wooldridge | 172/430 X |
| 4,162,708 | 7/1979 | Johnson | 172/4.5 |
| 4,204,253 | 5/1980 | van den Hannenberg et al. | 364/200 |
| 4,221,266 | 9/1980 | Fardal | 364/118 X |

FOREIGN PATENT DOCUMENTS

| | | | |
|---|---|---|---|
| 575086 | 4/1959 | Canada | 172/430 |
| 854859 | 7/1949 | Fed. Rep. of Germany | 172/430 |
| 2544724 | 4/1977 | Fed. Rep. of Germany | 111/1 |
| 532711 | 9/1955 | Italy | 172/413 |
| 577411 | 5/1958 | Italy | 172/430 |
| 1439656 | 6/1976 | United Kingdom | 172/430 |

OTHER PUBLICATIONS

Fundamentals of Machine Operation Planting, Deere & Company, Moline, Ill., pp. Cover, ii, iii, iv, 3, 4, 21, 26, 27, 3740 & 7779.

Operator's Manual–John Deere 7100 Folding Max--Emerge Planter, OMA28190 Issue K5, pp. Cover, 1, 21 & 7275.

Primary Examiner—Richard T. Stouffer
Attorney, Agent, or Firm—Neuman, Williams, Anderson & Olson

[57] ABSTRACT

An apparatus is provided for remote selective operator adjustment and display of the position of adjustment of a plurality of ground-supported planting units of a planter. The apparatus includes a planter gauge wheel on each unit adjustably mounted thereto and supporting each unit over the ground. A position sensor on each unit conveys gauge wheel adjustment information for numerical display on a central control box mounted adjacent to the planter operator's position. A hydraulic or electric cylinder mounted on each unit selectively effects positional adjustment of the respective gauge wheel according to operator control signals. The units are controlled in one embodiment via individual planter unit switches or a single planter adjustment switch manipulated by the operator. In other embodiments the units are controlled via microprocessor control systems wherein operator commands are entered via a keyboard or a rotary switch. The positional display of each planter unit assists the operator in making the remote planter unit adjustments.

29 Claims, 11 Drawing Figures

PLANTER IMPLEMENT WITH ADJUSTING POSITION-DISPLAY APPARATUS AND SYSTEM THEREOF

BACKGROUND OF THE INVENTION

This is a continuation-in-part of now abandoned copending application Ser. No. 102,635, filed Dec. 11, 1979, which is a continuation of now abandoned application Ser. No. 831,558, filed Sept. 8, 1977.

This invention relates to agricultural seed planters, and more particularly apparatus of a type employed to monitor and adjust the seed planting depth of a planter from the operator's position, while planting a field.

The depth at which seed is planted has long been recognized as having an important and direct effect on quick seed germination and proper healthy emergence. An optimum planting depth depends on seed type and soil type and condition. With the advent of multiple row high speed planters capable of sowing considerable acreage in short periods of time, the likelihood of encountering varying soil types during a single sustained operation and/or over short time spans has increased. The ability to quickly and easily adjust seed planting depth to appropriate parameters for changing conditions has become correspondingly important.

A manual adjustment of planting depth on each planter of a multiple row planter may provide acceptable average planting depths for a field. However, the planter operator is unable to adjust the multiple row planter for observed changes in soil type or condition without stopping the planting operation, leaving his operator position, manually adjusting each planter unit and returning to his position. An increasing loss of planting efficiency results each time manual readjustment is required, and this usually occurs during a time critical phase of an agricultural operation. To avoid such time and planting efficiency losses, the operator must plant an entire field with only a single, or "average" depth setting, with a resulting loss of yield.

Previously proposed devices which sense ground hardness and/or level, and which correspondingly modify the downward force on a furrow-forming element to maintain a desired furrow depth, do not assure positive and accurate depth control such as is achieved by adjusting the combination planter unit support and furrow-gauging wheel. In addition, the need to employ separate ground sensing parts on each planter unit of a multiple row planter would result in a great multiplicity of parts which may become disassociated, lost or broken.

OBJECTS OF THE INVENTION

It is an object of the present invention to provide improvements in planters which overcome the above-stated problems.

It is another object of this invention to provide an improved, low cost and simplified apparatus for monitoring and adjusting relative planting depths.

Still another object of this invention is to provide an apparatus which is employed to adjust and monitor the planting depths of planting units while the planter is being operated in a field.

Yet another object of this invention is to provide an apparatus which may be employed to adjust all planter units at one time, or each unit individually from an operator's control position.

SUMMARY OF THE INVENTION

The foregoing objects are achieved by an apparatus and system according to the invention which includes a plurality of planter units pivotally attached to a planter support bar. Adjustably attached to and mounted on planter unit is a gauge wheel, which also supports the planter unit. A planter position display is mounted in a position visible to the operator, and a planter unit adjustment control is within the reach of the operator. The position display is connected to a sensing element on each planter unit which senses the position of adjustment of each gauge wheel relative to the respective planter unit. The position of adjustment of each gauge wheel may be changed by operation of the adjustment control, which is connected to a power source mounted on each planter unit and connected to the respective gauge wheel.

Other objects, advantages and features of the invention will become apparent upon reading the following detailed description and appended claims, and upon reference to the accompanying drawings.

BRIEF DESCRIPTION OF THE DRAWINGS

For a complete understanding of this invention, reference should now be had to the embodiments illustrated in greater detail in the accompanying drawings and described below by way of example of the invention.

In The Drawings

It should be understood that the drawings are not necessarily to scale and that in certain instances, details which are not necessary for an understanding of the present invention or which render other details difficult to perceive have been omitted.

While the invention will be described in connection with illustrative embodiments, it will be understood that they are not intended to limit the scope of the invention. On the contrary, it is intended to cover all alternatives, modifications and equivalents as may be included within the spirit and scope of the invention as defined by the appended claims.

DETAILED DESCRIPTION OF ILLUSTRATIVE EMBODIMENTS

Figure 1:
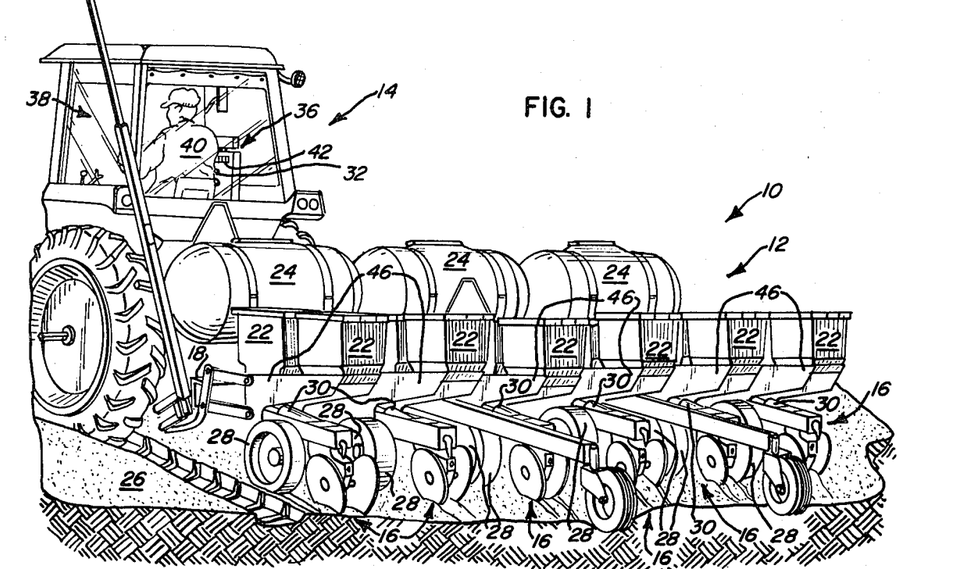
FIG. 1 is a perspective view of an illustrative embodiment of an apparatus and system embodying principles of this invention as used in conjunction with a six-row corn planter.

Turning now to the drawings, and principally FIG. 1, an apparatus 10 according to this invention is shown as used in conjunction with a multiple-row corn planter 12 and tractor unit 14, pulling the planter 12. The corn planter 12 includes a plurality of individual row planter units 16 which are pivotally attached to a planter support bar 18 (FIG. 2) running the width of the multiple-row planter 12. The support bar 18 attaches to the tractor 14, and is maintained in position by the tractor 14 and by planter wheels secured to the bar 18. A primary lift/lower system (not shown) of a known type, which typically is hydraulically actuated, is provided for moving the planter units between a raised inoperative position and a lowered planting position.

Each planter unit 16 may be provided with a variety of hoppers 22 which accommodate the seeds to be planted, as well as herbicides or the like to be spread by the planter for control of insects, weeds, etc. So too, large tanks 24 may be provided for liquid fertilizer to be placed by the equipment associated with the planter.

As will be hereinafter described, when each planter unit 16 is in the lowered planting position, the unit is supported over the ground 26 by a pair of support or gauge wheels 28 which are adjustable, relative to the planter unit 16, so as to raise or lower the unit 16 relative to the ground. A hydraulic adjustment cylinder 30 is mounted on each unit 16 to effect adjustment of the respective gauge wheels 28 in response to operator-instituted inputs for adjusting the planting depth of each unit. In a first embodiment, such operator inputs are generated by the manipulation of switches 32 (FIG. 7) and/or buttons 34 on a control box 36, mounted adjacent to the tractor operator's operating position 38. In addition to adjusting each planter unit's position of adjustment, the tractor operator 40 may observe numerical indications at a control box display 42 (FIG. 7) relative to the position of adjustment of each planter unit 16.

Figure 2:
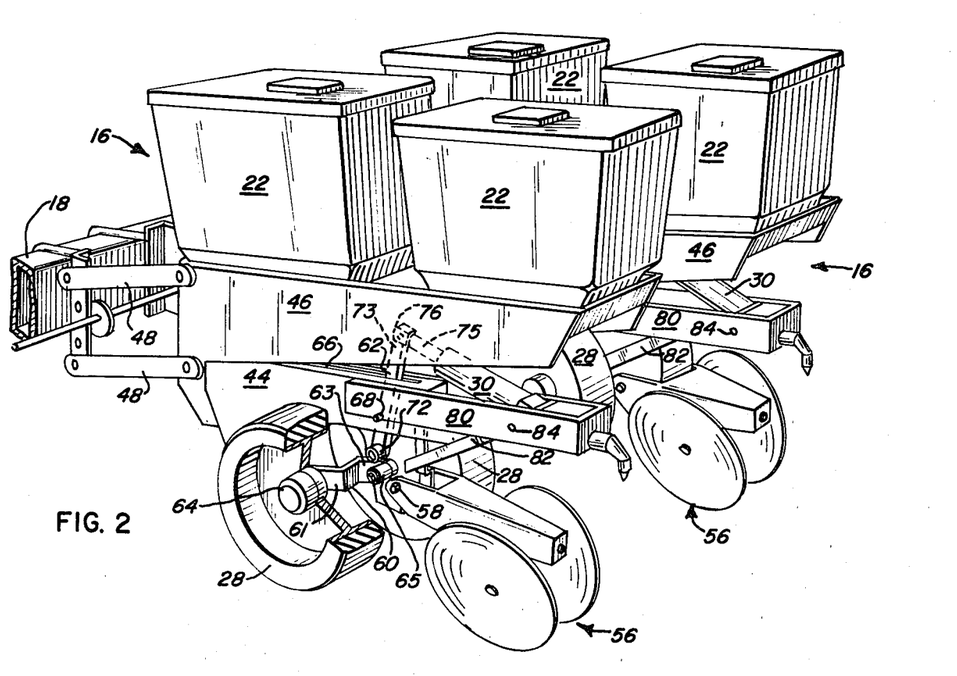
FIG. 2 is an enlarged perspective view of two planter units of the multiple-row planter of FIG. 1.

Turning now to FIG. 2, each planter unit 16 includes a frame 44, upon which is secured a hopper support structure 46. The planter unit 16 is secured, for free vertical pivotal movement, to support bar 18 by brackets 48 extending between planter frame 44 and bar 18. A pair of V-mounted furrow-opening discs 50 (FIGS. 4, 5) are secured by bearing assemblies 52 to extensions 54 of the frame 44, and move therewith as the frame 44 is adjusted. Following the furrow opener 50 is a furrow-closing subassembly 56 which is attached for pivotal movement relative to frame 44, at pin 58.

A pair of gauge wheels 28 straddle the furrow opener 50, and are adjustably attached to planter frame 44 by wheel brackets 60. One end 61 of the bracket 60 is pivotally mounted to the gauge wheel axle 64, while the opposite end 63 is pivotally mounted on frame 44 by a pivotable bushing 65. The position of depth-setting adjustment of the gauge wheels 28 is determined by the angular relationship between the wheel bracket 60 and planter frame 44. The wheel bracket 60 is maintained in its desired position of adjustment by support adjustment bar 62, mounted to frame 44 for pivotal movement at pin 68. The bar 62 extends through a longitudinal opening 66 (FIG. 3) in the frame 44, and is T-shaped at one end 70 thereof with each shaft 71 of the T extending over the upper edge 74 of the respective wheel bracket 60. Each outwardly-extending shaft 71 carries a support roller 72 thereon which serves as a fixed stop for the bracket 60 while facilitating movement of the bar 62 along wheel bracket edge 74. The rollers 72, along with bushings 65, thus serve as supports for the frame 44 on the brackets 60 when the planter is lowered to its planting position by the primary lift/lower mechanism. The opposite end 73 of the bar 62 includes a pin-receiving opening through which the bar 62 is attached to a piston rod 75 of the hydraulic adjustment cylinder 30. End 73 is sandwiched between rod pieces 76, and is maintained in place therebetween by a pin 78.

Hydraulic cylinder 30 is mounted for pivotal movement on a pin 84 extending between girding pieces 80 welded to frame 44 and secured in place by braces 82. Direct and corresponding movement of piston rod 75 and the end 73 of bar 62, as effectuated by the activation of a piston on rod 75 in cylinder 30, causes relative movement of T-end 70 of bar 62 over the wheel brackets 60, thereby changing the stop position of the rollers 72. This increases or decreases the angle between the bracket 60 and the frame 44 when the frame and related unit are supported on the bracket 60 and wheel 28, and therefore adjusts the vertical positional relationship between frame 44 and gauge wheels 28.

Figure 4:
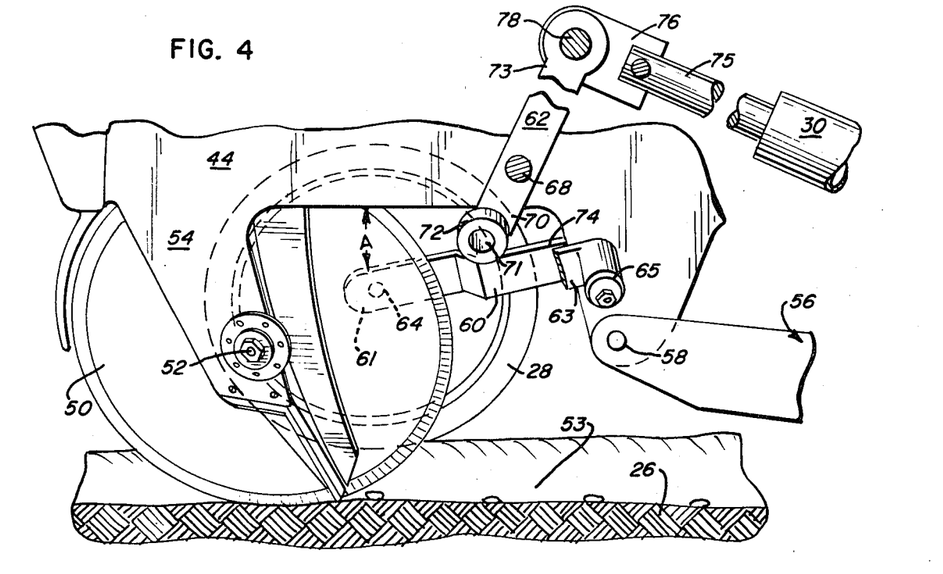
FIG. 4 is a fragmentary side perspective view of the planter unit of FIG. 3, shown in a first position of adjustment.
Figure 5:
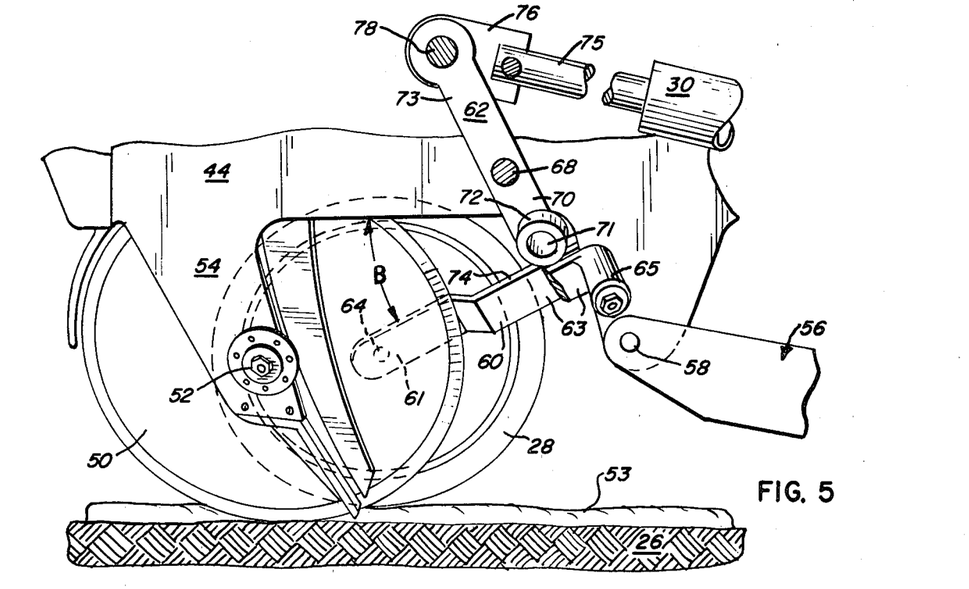
FIG. 5 is a fragmentary side perspective view of the planter unit of FIG. 4, shown in a second position of adjustment.

As best shown in FIGS. 4 and 5, the depth of the furrow 53 cut by the disc-shaped furrow opener 50 is directly related to the position of adjustment bar 62. When the piston rod 75 is fully retracted and the planter unit is lowered to its planting position, as in FIG. 4, the rollers 72 on T-end 70 will ride on wheel bracket 60 at a position remote from the pivotal junction 65 thereof with frame 44. The resulting angle A between the frame 44 and wheel bracket 60 will be relatively small, with the result that the furrow opener 50 will extend into the ground 26 to its greatest extent.

If, on the other hand, the piston rod 75 is moved to its fully extended position (as in FIG. 5), the rollers 72 on T-end 70 will assume a position adjacent to the pivotal junction 65 and thereby effect and maintain a larger angular relationship B between the frame 44 and wheel bracket 60. As the wheel bracket 60 is forced downwardly by the adjustment bar 62, the gauge wheels 28 will be extended downward. Assuming the gauge wheels 28 are in position on the ground, the resulting downward force is translated into upward movement of the frame 44 and the disc-shaped furrow opener 50. Alternatively, if the extending movement of the piston is effected while the planter units are raised from the ground, the same adjustment of the components will limit the depth of the furrow openers when the unit is lowered by the primary lift mechanism to return the unit to operating conditions with the weight of the planting units partially on the gauge wheels 28. In any event, the furrow opener 50 will thus be carried at its highest position, relative to the ground, and will cut its shallowest furrow.

The weight of the planter units and frame 44 normally assure penetration of the furrow openers to the full depth permitted by the abutment of the support rollers 72 on brackets 60. Additional downward forces may be applied if necessary to insure penetration of the furrow openers to the permitted depth. Thus the planting unit is carried in part on the gauge wheels in the planting mode, with the furrow openers at the depth position permitted in accordance with the setting of the stops 72. However, the wheels are free to pivot downward relative to the frame when the load is removed, such as when the entire planter is raised by the primary lift mechanism. The frame similarly remains free to rise independently of the gauge wheels for safety purposes, as in the event of the furrow openers encountering a rock or other obstruction in the soil or otherwise being forcibly moved upward relative to the gauge wheels.

As referred to hereinabove, the position of the adjustment bar 62 determines the angular relationship between the planter frame 44 and wheel bracket 60, and thus the vertical position of the gauge wheels 28 relative to planter frame 44 when in the planting mode. The position of the adjustment bar 62 will, as a result, be directly related to the depth setting position of the gauge wheels 28. By sensing the position of the bar 62, an accurate measure of the gauge wheel/planter frame depth adjustment can be determined.

Figure 3:
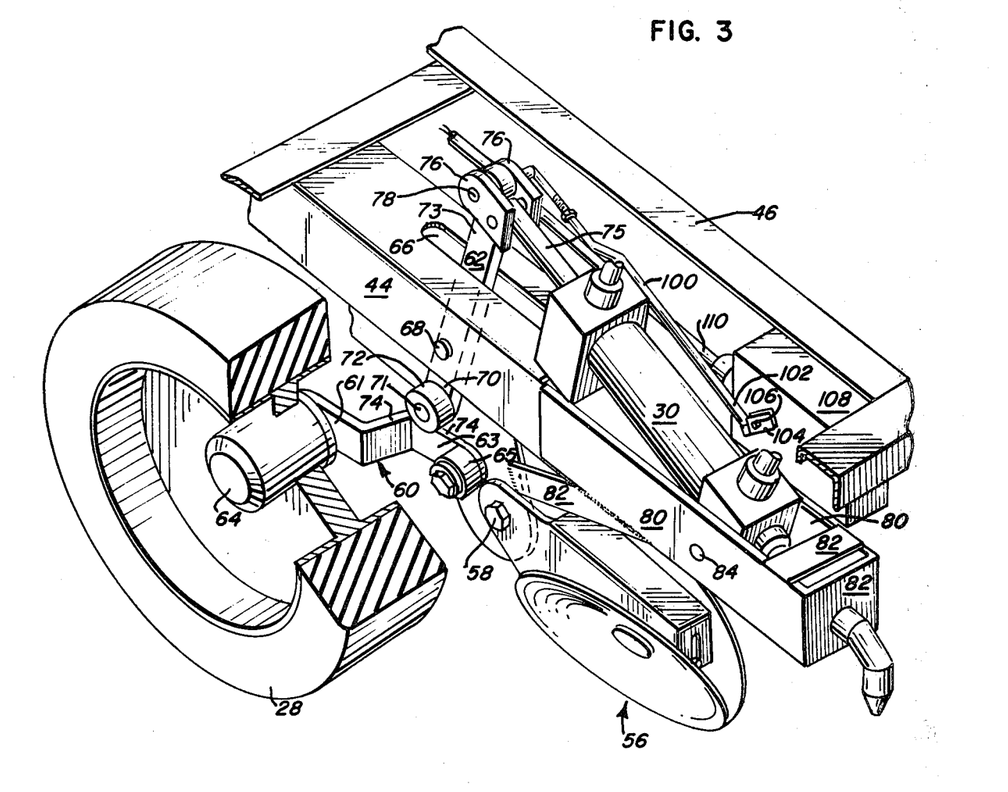
FIG. 3 is an enlarged perspective view of one planter unit of FIG. 2, with portions thereof cut away.
Figure 6:
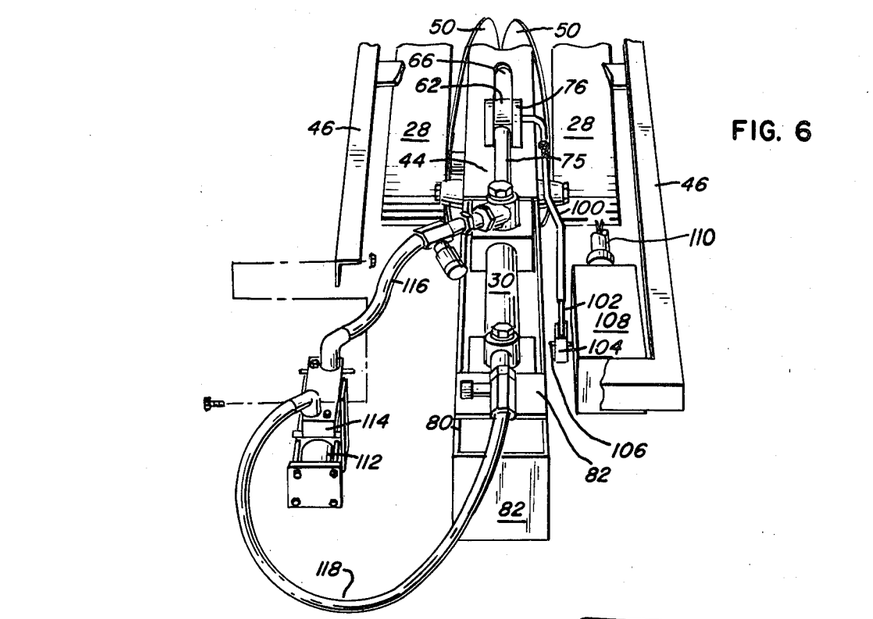
FIG. 6 is a perspective view of the planter unit of FIG. 2 with portions thereof cut away.

As shown in FIGS. 3 and 6, the position of the adjustment bar 62 is sensed by a sturdy metal rod 100, welded or otherwise secured to one rod plate 76 holding bar 62. The metal rod 100 is attached at its opposite end 102 to a U-shaped piece 104 provided with holes (not shown) therein which are adapted to securely accommodate the shaft 106 of a potentiometer 108 therethrough. As the position of the adjustment bar 62 is moved by the relative extension of the hydraulic piston rod 75, the rod 100 will be moved longitudinally. The movement of the rod 100 is transformed to rotational movement of the potentiometer shaft 106 by piece 104. The change in electrical potential at the potentiometer 108 is transmitted to the control box 36 by cable 110 and translated into one of the numerical representations on the display 42 by known electrical read-out techniques. In this embodiment, the display range is divided into a digital read-out of numbers 1 to 17 for the normal range of depth adjustment of a corn planter. If the adjustment bar 62 assumes a position between display values, an incomplete numerical image will be displayed as at 111 in FIG. 7, to so indicate an intermediate position to the operator.

Figure 7:
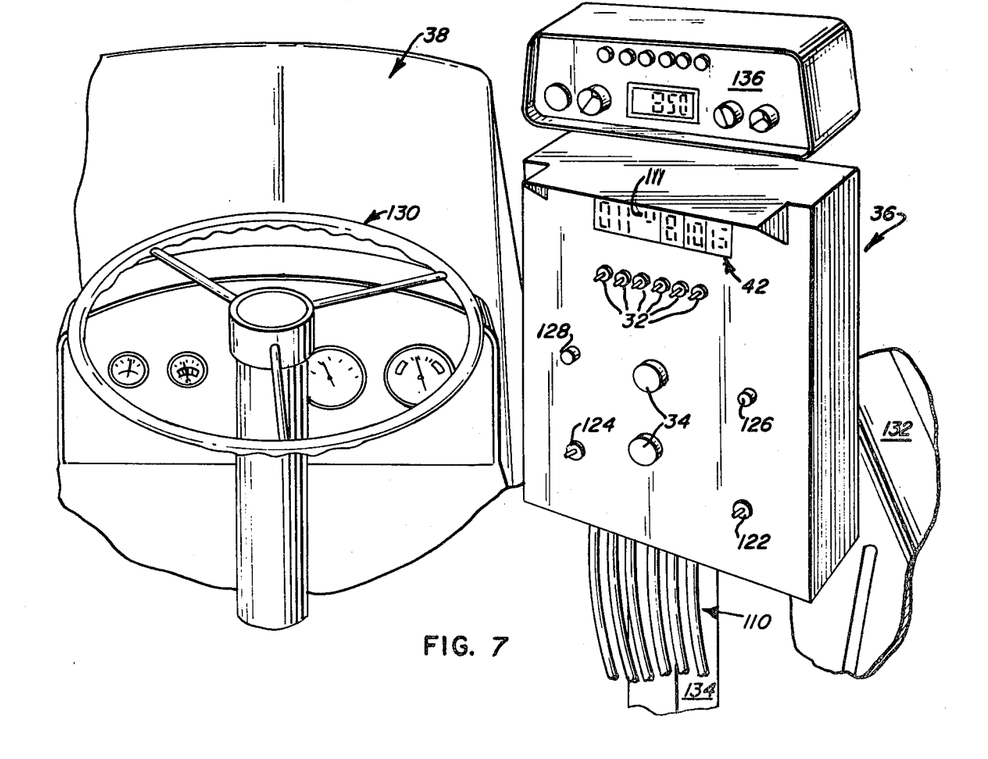
FIG. 7 is a perspective view of the planter operator's position, showing a control box of the apparatus in relation thereto.

Also included in the control box 36 of FIG. 7 are six single-pole, double-throw, center-off momentary contact toggle switches 32, one for each planter unit 16. Each switch 32 may either be moved to an up or down position, and thereby activate the solenoid portion of a parallel, 4-way, spring-centered valve 112, including a double cycle lock valve 114, of the type manufactured, for example, by the Hydraulic Components Division of Rexnord Corporation. Such a valve is hung from the hopper support structure 46, and is attached to the hydraulic cylinder 30 on each planter unit 16. By use of this valve, hydraulic fluid under pressure, from a central source (not shown) is channeled in front of or behind the hydraulic piston in the cylinder 30 through valve lines 116, 118 in accordance with up or down positioning of the respective switch 32 to effectuate the desired movement of the piston rod 75. The cycle lock valve 114 is mounted directly over the 4-way valve 112 and acts to maintain hydraulic pressure within the cylinder 30 once the desired piston position has been achieved and the switch 32 is centered, in its "off" position.

Referring again to FIG. 7, master up and down adjustment buttons 34 are provided on the control box 36 so that adjustment of all of the cylinders 30 and hence of all planter units 16 may be accomplished simultaneously in one operation. A master on/off switch 122, and light display switch 124 (along with indicator lights 126, 128) are also contained in the control box 36. The control box 36 is of such size and dimension as to be easily and securely mounted between the operator's steering controls 130 and an adjacent tire fender 132. The control box is secured to a post 134 which is preferably mounted to the tractor at a position easily accessible to the operator 40. A variety of other monitoring units, such as a Dickie-John seed monitor 136, may be mounted on the control box 36 so that all monitoring of the planter operation may be accomplished by the operator in one glance.

In operation, an initial and approximate depth setting for each planter unit 16 is estimated by the planter operator 40, based on the observed field conditions and any previous knowledge of the results of various planter depth settings under similar conditions. However, some experimentation may be necessary to determine the setting required to obtain optimum planting depth under current conditions. The optimum or desired planting depth for a particular soil condition typically is known, and is assumed to be known to the operator. The displayed numerical value of the planter units that results in the desired depth of planting, e.g., 10, is noted and becomes the current reference setting which will assure optimum furrow depth for that one observed soil condition. If a different soil condition or type is encountered, the planter unit depth settings are adjusted by the controls until the optimum planting depth for that soil condition or type is obtained. The new numerical display value then becomes the reference setting for optimum furrow depth in that soil condition. Calibrations for a wide variety of soil types and conditions can be similarly determined if not previously determined. Thereafter, when soil conditions or type change during planting of one or a succession of fields, the operator need only manipulate the controks 32, 34 to adjust the planter units 16 to the predetermined display value which has been established for optimum furrow depth in the soil condition or type being encountered at a particular moment in the planting operation. At his option, the operator may adjust one, some or all planter units 16 depending on changing soil conditions along the rows being planted. In this way, accurate remote adjustment of each planter unit 16 may be made to assure optimum furrow depth, without interrupting the planting operation.

Figure 8:
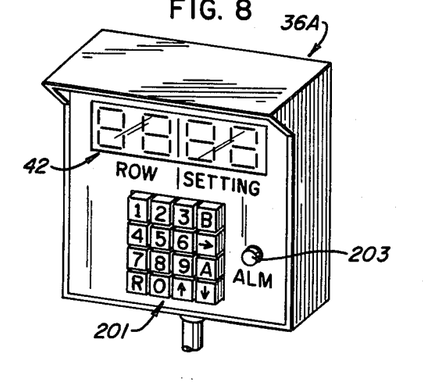
FIGS. 8 and 9 are perspective views of operator control boxes for alternate control systems utilizing a microprocessor.
Figure 9:
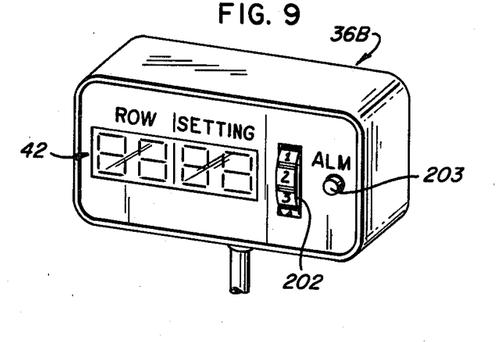
Figure 10:
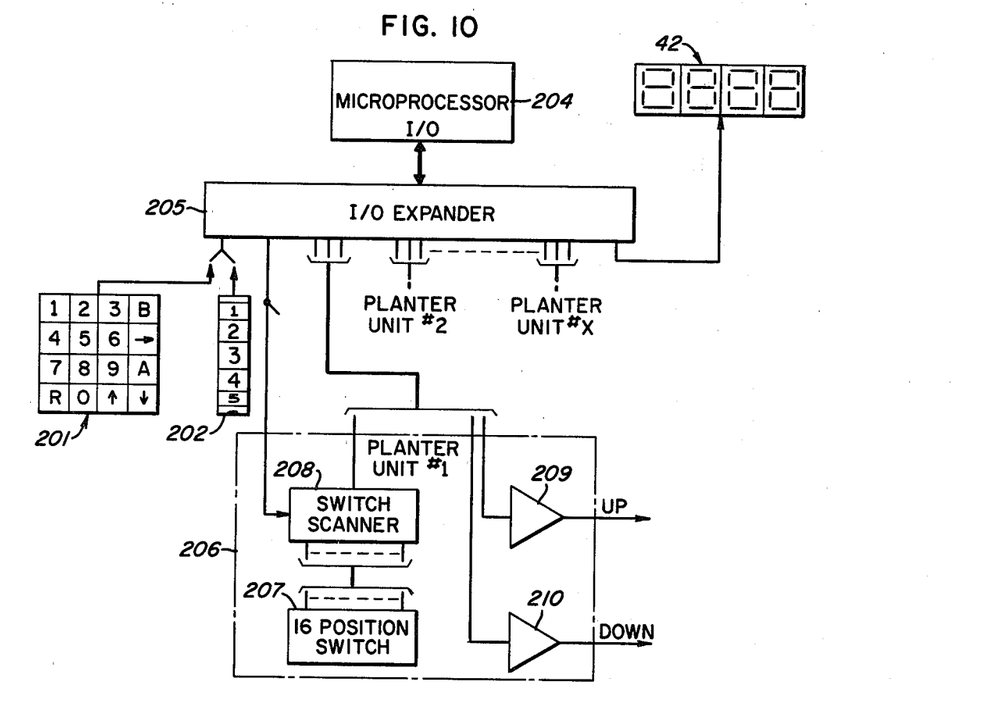
FIG. 10 is a block diagram of the alternate microprocessor control systems.

It will be appreciated that various specific control systems may be utilized in practicing this invention. By way of example, FIGS. 8-10 illustrate systems using a microprocessor for automatically adjusting and maintaining each planting unit at the depth setting selected by the operator. Two alternate control boxes 36A and 36B are shown in FIGS. 8 and 9. In each the control box display 42 has been reduced to a four-digit display wherein the left two digits indicate the row unit whose depth setting position is displayed by the right two digits. This display system has capacity for the display of up to 99 planter heads or row units and a similar number of settings for each unit. The row or unit numbers and corresponding depth settings are sequentially displayed by the control system.

The control box of FIG. 8 has an input keyboard 201 which allows information to be input to the system microprocessor for controlling the planter units. The numerically numbered keys on the keyboard 201 correspond to those numerals, i.e., one corresponds to one, two corresponds to two, one followed by three corresponds to thirteen, etc. The R key designates "row"; the B key designates "bank" or gang; the A key designates "all"; the up arrow key designates "up"; the down arrow key designates "down"; and the right arrow key designates a transition or "to". The utilization of the keyboard 201 and the various control sequences which can be inputed to the microprocessor contained in control box 36A of FIG. 8 will be more fully described hereinafter.

Fig. 9 shows a control box 36B for a simplified microprocessor control system wherein the keyboard 201 is replaced by a rotary switch 202. The microprocessor control system which utilizes the control box 36B of Fig. 9 interprets the setting on the thumb-wheel switch 202 as the depth setting to which each of the row units is to be set. The display 42, as in Fig. 8, cyclicly displays the individual row unit numbers and the corresponding depth setting positions of the units in sequence with each row display appearing for a sufficient period of time to be observed by the operator who thereby is aware of any erroneous depth positions and is provided with current operational information as the basis for any changes that might be deemed desirable. An alarm light 203 also is lighted by the microprocessor whenever any unit does not correspond to the desired depth setting as indicated either by the input on keyboard 201 or by the position of the rotary switch 202. Thus, an alarm indication is provided during the time that changes are being made in the setting of the planter and also whenever any unit does not correspond to its requested setting. The alarm light also may flick on momentarily during operation due to planter units rising up over rocks, etc. However, if the alarm light 203 comes on continuously, a malfunction or misposition is indicated and the display 42 is observed to determine which row unit or units are at fault so that the problem can be corrected. Other alarm devices may be similarly actuated, e.g., audible, visual or operation interrupting means.

Fig. 10 shows a block diagram of a control system for the planter incorporating a microprocessor as illustrated schematically at 204. The input/output (I/O) ports are expanded by an I/O expander 205 to accommodate the required number of inputs and outputs for a specific planter. One example of a possible microprocessor is the M8048 which can be coupled with I/O expanders ID8243, both manufactured by Intel Corporation. This microprocessor configuration will accommodate a planter having up to forty planter units or rows. The microprocessor 204 receives input control signals from either the keyboard 201 or the rotary switch 202, which are interchangeable with one another. The microprocessor scans the keyboard or the rotary switch to determine the selected positioning for the planter units. The individual keys of the keyboard 201 are mutually exclusive, i.e., only one key will generate a signal no matter how many keys are actuated. The keys generate a signal only when actuated so that the microprocessor must retain a given signal or sequence of signals until a second signal or sequence of signals is generated by the operator by actuating keys on the keyboard.

The control for planter unit No. 1, identified by the numeral 206, is illustrative of the circuitry included on each of the planter units and, accordingly, will be the only unit control described. A multiple position switch 207, e.g., sixteen positions, replaces the potentiometer 108 for use with the microprocessor control system. The various depth settings of the individual planter units are represented by the positions of the switch 207. The microprocessor 204 through the I/O expander 205 provides a coded sequential signal to switch scanner 208 which sequentially scans the multiple output terminals of the switch 207 to determine the position of planter unit No. 1. A voltage signal on one of the output terminals of the multi-position switch 207 indicates that the planter unit is positioned at that depth setting. The microprocessor 204 receives the voltage signal from that terminal via the switch scanner 208 and the I/O expander 205 and stops the sequential signals to the switch scanner 208. The position of planter unit No. 1 thus determined is compared to the desired depth setting for that planter unit.

Figure 11:
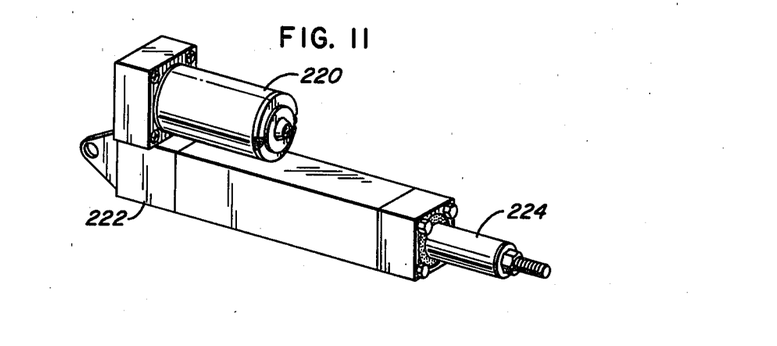
FIG. 11 is a perspective view of an electric cylinder such as may be used on planters embodying principles of this invention.

If the position of the planter unit is below the desired depth setting, the up amplifier 209 is activated by the microprocessor 204; if the position is above the desired depth setting, the down amplifier 210 is activated; and if the indicated position is equivalent to the desired depth setting, neither amplifier 209 nor amplifier 210 are activated. Accordingly, the power adjusting means, e.g., the hydraulic cylinder 30 or the electric cylinder of FIG. 11, is actuated automatically in the appropriate direction as necessary to position the respective planter unit at the depth setting which has been selected by the operator. Each planter unit is individually scanned by the microprocessor in sequential order. The scan rate through the individual planter units is so rapid that no appreciable movement of a planter unit can take place between individual scan cycles; accordingly, the up or down amplifier is turned on or off only when a planter unit is being scanned.

The following are examples of various command modes for the microprocessor control system with a keyboard input as in FIG. 8. For all rows to be set to a desired position, the A or "all" key is actuated followed by the right arrow "to" key followed by the numerical designation of the desired depth setting (e.g., 1 through 16). The desired depth setting thereby is written into all memory locations assigned by the microprocessor to correspond to the depth settings to be maintained by the individual planter units. The microprocessor continuously scans through all the planter units to determine the position of each of the units and to reposition each one to its assigned depth setting as necessary.

If the rotary switch 202 is provided in place of the keyboard 201, the setting of the rotary switch generates a signal which is equivalent to a keyboard command of all rows to the setting of the rotary switch. This signal is continuously provided to the input of the I/O expander 205 and scanned by the microprocessor 204 to detect movements of the rotary switch 202 which movements indicate desired depth setting changes.

If the keyboard 201 is provided, the rows can be individually controlled by depressing the R or "row" key followed by a numeral to identify the row, followed by the right arrow "to" key, followed by the desired depth setting for that row. For example, to set row 7 to position 12, the following key sequence would be entered: R, 7, right arrow, 1, 2.

Similarly, banks or gangs of single row planter units can be controlled using the B or "bank" key. The control of the planter units in banks or gangs is particularly important in folding bar planters or any planter permitting articulation in gangs, where it may be desirable to control all planter units on a given bar or gang simultaneously while also retaining the single row control capability. Banks can be defined to be any number of planter units. For example, a planter having sixteen planter units could be programmed in two unit banks, four unit banks, a combination of three unit and two unit banks, or any other reasonable combination such that the total adds up to sixteen individual planter units. This flexibility is attained easily with the programmability of a microprocessor. In any event, once the banks or gangs have been defined in the microprocessor program, all of the units within each of the banks can be changed to a given position by actuating the B or "bank" key, followed by the bank identification number, followed by the right arrow "to" key, followed by the desired depth setting for that bank of planter units. For example, to change bank 3 to depth setting 10, the following sequence would be entered: B, 3, right arrow, 1, 0.

The up arrow "up" key and down arrow "down" key provide for changing all planter units a desired number of incremental depth settings from their present positions. For example, the sequence of up arrow, 1, moves all planter units up, i.e., to a shallower planting position, by one incremental setting; and the sequence of down arrow, 2, moves all planter units down, i.e., to a deeper planting position, by two incremental settings. It is noted that the various planter units do not need to be at the same depth setting either before or after such incremental changes.

The foregoing variations of commands illustrate the availability of any number of alternative command sequences. For example, defined "rakes" could be programmed into the microprocessor such that a predefined rake could be selected when planting a given field. Herein the term rake means a pattern of defined positions for each of the individual planter units across the entire planter. For example, when planting a given field which has a defined slope, the rake on the planters could be for progressively different depth positions across the planter, and could be quickly and automatically reversed as the operator reversed direction of planting across the slope to provide even depth of planting throughout the entire field. Other defined position patterns of depth settings for the individual planter units can be set for specified conditions or even for identified fields or portions of fields being planted.

Various power devices may be utilized to automatically adjust the row units in response to the control commands set by the operator. For example, electric cylinders such as the one shown in FIG. 11 may be utilized in place of hydraulic cylinders to control the individual planting units. Such electric cylinders include a reversible electric motor 220 which internally drives a lead screw contained within a housing 222 to drive the thrust tube or "piston" rod 224 in and out of the housing. Electric cylinders are well known in the art and commercially available from such companies as General Motors (Saginaw Division), Industrial Devices Corporation of California and Suff-Norton Company of N.C.

A problem that may be encountered with electric cylinders is high current demand if all cylinders are activated simultaneously. The microprocessor control system as described is advantageously utilized to reduce instantaneous current demand by sequencing individual planter units or banks or gangs of planter units such that the overall adjustment of the planter is accomplished in discrete steps across the entire planter. Such sequencing spreads the adjustment of the overall planter unit over a period of time which reduces peak current demand to acceptable levels, e.g., for a typical electrical system of a tractor. Sequencing the activation of electric cylinders is readily incorporated into a microprocessor program.

Thus, apparatus has been described which effectively monitors and adjusts planter unit settings for optimum furrow cutting and hence seed planting depth. While particular embodiments of the invention have been shown, it will be understood, of course, that the invention is not limited thereto since modifications may be made, and additional embodiments of the principles of this invention will occur to those skilled in the art to which the invention pertains, upon considering the foregoing teachings. For example, a variety of specific mechanical arrangements may be utilized in various planters for effecting the selective depth settings accomplished in the aforedescribed embodiments by the components 60, 62 and 72. Similarly, a wide variety of position sensing and signalling devices and arrangements may be used to monitor the units. Accordingly, it is contemplated by the appended claims to cover any modifications and other embodiments as incorporate those features which constitute the essential features of this invention within the true spirit and scope of the following claims.

What is claimed is:

1. An apparatus for remotely determining and setting a row planter's furrow depth setting, comprising a planter support bar; a plurality of separate single row planting units each including a planter frame movably connected to said support bar to permit free vertical movement of the respective unit, a furrow opening member secured to said planter frame, a gauge element adapted to support said planter frame over the ground in a plurality of positions of adjustment, a connector piece extending between said gauge element and said planter frame and being pivotally mounted for adjustment relative to said planter frame, an adjustment bar mounted on said planter frame and adjustable between predetermined limits, said adjustment bar engaging said connector piece to effect adjustment of said gauge element relative to said planter frame, remotely activated power means which effects moving adjustment of said adjustment bar, and position sensing means for ascertaining the position of adjustment of the gauge element relative to the planter frame thereby providing an indication of the depth setting of said furrow opening member; and means for displaying the position of adjustment of each adjustment bar, whereby the displayed positional information is directly related to the nominal depth of said furrow opening member, and the depth setting of each of said furrow opening members may be independently actuated by remote activation of the respective power means.

2. In an agricultural planting implement an improved planting depth control system including a frame; a lift/lower system for moving said planting implement between a raised transport position and a lowered planting position; a plurality of separate single row planting units movably connected to said frame to permit free vertical movement of each unit, each planting unit mounting a furrow opening means and a power support means; a separate ground engaging gauge means being associated with each of said planting units for supporting the respective planting unit over the ground, each of said power support means adjustably controlling the position of the respective planting unit relative to the respective gauge means for controllably adjusting the depth of penetration of the respective furrow opening means into the ground; position sensing means for ascertaining the position of adjustment of each gauge means relative to the respective furrow opening means thereby providing an indirect indication of the planting depth of the respective planting unit; means located at an operator observable position for displaying information provided by the sensing means of each planting unit; and means located at an operator's control position for manipulation by said operator to independently control said power means of each of said planting units, whereby an operator of said implement can monitor and independently control the depth at which each of said planting units is operating from the implement control position.

3. The system of claim 2 wherein said position sensing means includes electrical resistance means which varies continuously as the position of said gauge means varies with respect to said unit.

4. The system of claim 2 wherein said control means comprises a computer.

5. The system of claim 4 wherein said computer comprises: a microprocessor; signaling means manipulated by said operator for generating control signals for said microprocessor; scanner means for scanning said position sensing means; amplifier means for controlling said power support means; input/output means for interconnecting said signaling means, said scanner means, said information displaying means and said amplifier means to said microprocessor.

6. In an agricultural planting implement having a main support bar, a plurality of ground-supported planting units movably attached to the main support bar and a lift/lower system for moving said planting units between a raised inoperative position and a lowered planting position, each of said planting units provided with a ground engaging gauge element adjustably attached to and supporting said planting unit, an improved operator monitoring and adjustment system comprising: a control means mounted at an operator's control position for said planting implement for independent adjustment of said units both individually and in unison; a unit position monitoring means; a position sensing means mounted on each unit and providing information to said monitoring means indicative of the position of adjustment of said respective gauge element relative to said respective unit, said monitoring means displaying to the implement operator the relative position of adjustment of each respective gauge elment relative to each of said respective planting units; and a power means mounted on each of said planting units and connected between the respective gauge element and planting unit, said power means being responsive to operator adjustment of said control means for selectively adjusting the position of the respective gauge element relative to the respective planting unit individually and adjusting the positions of the respective gauge elements of all of said planting units in unison.

7. In combination with a planter implement having a lift/lower system for moving said implement between a raised position for transport and a lowered position for planting and being designed for control from a remote operator's position, said planter implement having a plurality of planting units each including planting components and a ground engaging gauge element for support of the respective planting unit on the ground while in said planting position and each adjustable as to the depth setting of the respective planting components relative to the respective gauge element, the improvement comprising:

each of said planting units including power means for adjusting the relative positional setting between the planting components of the respective unit and the respective gauge element to determine the planting depth setting of each respective planting unit;

means for actuating each of said power means independently of the actuation of each other such power means to adjust the depth setting of such planting components of the respective planting unit independently of the depth setting of each other such planting unit; and control means mounted at the operator's position and adjustable by the operator to provide an operator-selected depth setting control signal to said actuating means, whereby each of said power means is independently controlled to maintain the depth setting selected by the operator.

8. The system of claim 2 or 7 wherein all of said planter units power support means also are simultaneously adjustable from the operator's control position.

9. The system of claim 2 or 7 wherein said means for controlling said power support means includes switch means mounted at the implement operator's control position which when activated provides electrical signals to said power support means for adjusting each of said gauge means relative to the respective planting unit.

10. The system of claim 9 wherein said means for displaying information provided by said sensing means includes a numerical display.

11. The system of claim 10 wherein said switch means and said means for displaying information are accommodated in a control box.

12. The combination of claim 7 wherein said power means comprise hydraulic cylinders and said actuating means comprise electrically controlled hydraulic valves.

13. The combination of claim 7 wherein said power means comprise electrically driven cylinders.

14. The system of claim 6 or 7 wherein each of said gauge elements is at least one gauge wheel rollingly supporting the respective planting unit over the ground.

15. In an agricultural planting implement having a main support frame, multiple planting units each mounting a furrow opener and being movably connected to said frame to permit free vertical movement of each unit relative to said frame, means for moving said planting units between a raised transport position and a lowered ground penetrating position, and means for controlling the depth setting of said furrow openers when in said ground penetrating position comprising a separate adjustable ground engaging support gauge means for each of said units adjustably connected to the respective unit for support of the unit on the ground and for setting the elevation of each furrow opener thereof relative to the ground, an improved depth control system comprising:

each of said units including a power means connected between each furrow opener thereof and the respective support gauge means for adjusting the respective support gauge means relative to the respective furrow opener in response to control signals, with said power means of each planting unit operable to adjust the depth setting of the respective furrow opener independently of the operation of the power means associated with the furrow openers of the other planting units; and control means remotely located at an operator's position for manipulation by an operator to generate said control signals.

16. The combination of claim 7 or 15 further comprising means in an operator observable position for indicating to the operator the conformance or nonconformance of each of said units or furrow openers to the selected depth setting.

17. The depth control system of claim 15 wherein said power means each comprises a hydraulic cylinder and an electrically controlled hydraulic fluid valve to control the flow of hydraulic fluid to and from said hydraulic cylinder in response to said control signals.

18. The depth control system of claim 15 wherein said power means each comprises an electrically driven cylinder.

19. In an agricultural planting implement having a lift/lower system for moving said planting implement from a raised transport position to a lowered planting position, an improved planting depth control system including a frame; a plurality of separate single row planting units movably connected to said frame to permit free vertical movement of each unit, each planting unit comprising: furrow opening means; power support means; ground engaging gauge means for supporting the respective planting unit over the ground, said power support means being connected between said furrow opening means and said gauge means and responsive to control signals to adjustably control the positions of said furrow opening means relative to said gauge means and thereby control the depth of penetration of the respective furrow opening means into the ground independently of the operation of the power support means of each of the other planting units; position sensing means for ascertaining the position of adjustment of said ground engaging gauge means relative to the respective furrow opening means thereby providing an indirect indication of the planting depth of the respective planting unit; said planting implement further comprising display means located at an operator observable position for displaying information provided by the sensing means of each planting unit; and control means located at an operator's control position for manipulation by said operator to generate said control signals to control the relative positions of said furrow opening means relative to said gauge means, whereby an operator of said implement can monitor and control the depth of penetration of the furrow opening means of said planting units.

20. The system of claim 2, 4, 7, 15, or 19 wherein each of said gauge means is at least one gauge wheel rollingly supporting the respective planting unit over the ground.

21. The system of claim 2 or 19 wherein said means for displaying information provided by said sensing means is mounted at the implement operator's control position.

22. The system of claim 21 wherein said means for displaying information provided by said sensing means and said means for controlling said power support means are accommodated in a control box.

23. The system of claim 15 or 19 wherein said control means further comprises means for providing individual depth setting signals to each of said power support means whereby each of said planting units can be set to different depth of penetration.

24. The depth control system of claim 15 further comprising multiple position sensing means, one position sensing means connected to each planting unit for generating position signals indicative of the position of said gauge means, and wherein said control means further comprises means responsive to said position signals for providing a readout of the position of each unit.

25. The system of claim 24, 15 or 9 wherein said control means comprises a computer.

26. The system of claim 25 wherein said computer comprises: a microprocessor; signaling means manipulated by said operator for generating command signals for said microprocessor; scanner means for scanning said position sensing means; amplifier means for generating said control signals; and input/output means for interconnecting said signaling means, said scanner means, said display means and said amplifier means to said microprocessor.

27. The system of claim 26 wherein said signaling means comprises a keyboard.

28. The system of claim 26 wherein said signaling means comprises a rotary switch.

29. The system of claim 26 wherein said position sensing means comprises a multiple position switch.

* * * * *

UNITED STATES PATENT AND TRADEMARK OFFICE
CERTIFICATE OF CORRECTION

PATENT NO. : 4,413,685

DATED : November 8, 1983

INVENTOR(S) : Philip E. Gremelspacher and Cornelius J. Gremelspacher

It is certified that error appears in the above-identified patent and that said Letters Patent are hereby corrected as shown below:

Column 2, line 6, should read "each" after --mounted on--; Column 6, line 35, "controks" should read --controls--; Column 9, line 54 "Suff-Norton" should read --Duff-Norton--; Column 11, Claim 6, line 45 correct the spelling of "element"; Column 12, Claim 9, line 1, "2 or 7" should read --2, 6 or 7--; Column 14, Claim 20, line 1, "2, 4, 7, 15 or 19" should read "2, 15 or 19"; Column 14, Claim 23, line 19, "depth" should read --depths--; and Column 14, Claim 25, line 1, "24, 15 or 9" should read --24, 15 or 19--.

Signed and Sealed this

Thirteenth Day of March 1984

[SEAL]

Attest:

GERALD J. MOSSINGHOFF

Attesting Officer

Commissioner of Patents and Trademarks